UNITED STATES PATENT OFFICE.

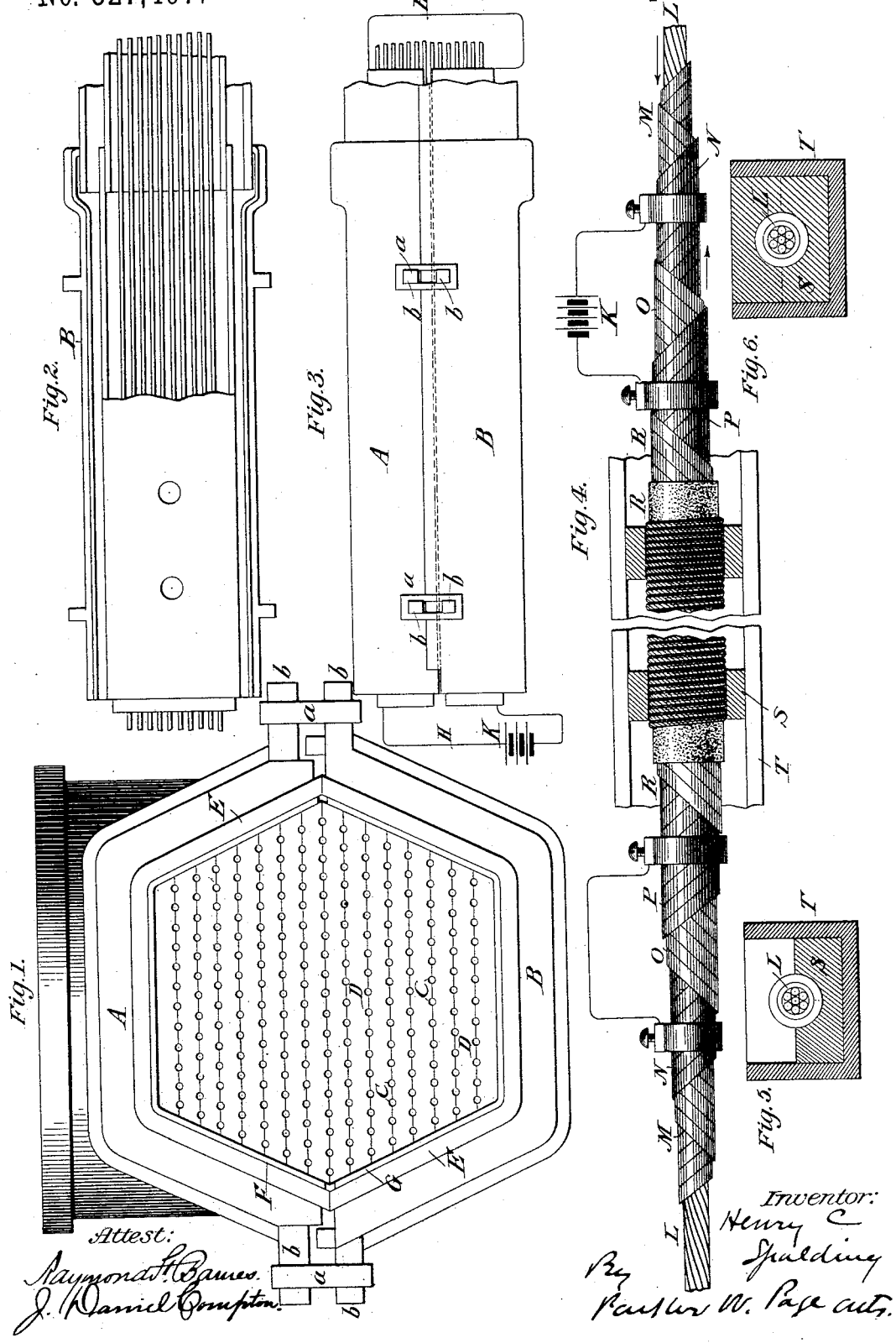

HENRY C. SPALDING, OF BOSTON, MASSACHUSETTS.

ELECTRIC CIRCUIT.

SPECIFICATION forming part of Letters Patent No. 327,497, dated September 29, 1885.

Application filed May 21, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Electric Circuits, of which the following is a specification, reference being had to the drawings accompanying and forming a part of the same.

My invention is applicable to any insulated conductor or group of conductors with which two insulated induction sheathings, screens, or conductors are associated; and it consists in connecting the two sheathings or screens in a closed electric circuit containing a generator of electricity, whereby a constant current is caused to pass or flow through the same in opposite directions. Another improvement for accomplishing this purpose is shown in my pending application No. 128,805.

The invention is exemplified in various forms of conduit and cable. For instance, I have shown and described in other applications a conduit composed of a sectional tube or pipe containing a number of insulated conductors. Between the conductors and the pipe are screens or plates of metal. The plates in the upper sections of the conduit are insulated from those in the lower, but are connected electrically along the whole line of the conduit. By connecting the screens in the two sections at their ends, and inserting a battery in the circuit thus formed, the requirements of the invention are fulfilled. On the other hand, in various applications I have shown and described cables containing one or more insulated wires, and having two or more metallic sheathings or layers in the protective and insulating cover by which the wire or wires are inclosed. My invention is carried out in such case by connecting electrically the two insulated sheathings at the ends of the cable and inserting in the circuit so formed a battery. In all cases it is obvious that the same results—that is to say, two currents flowing in opposite directions in proximity to the working-circuits—may be obtained by the use of two batteries instead of one, by keeping the screens in independent circuits; but the use of a single battery is preferable for many reasons. The invention is more particularly applicable to underground systems, though the ultimate object is the same in all cases—viz., to neutralize the inductive influences of the earth's electricity, and to prevent the inductive effects of the signaling-currents upon themselves, by this means facilitating rapid and distinct signaling with a reduced battery-power.

Owing to the great variety of conduit and cable to which the invention is applicable there are certain results secured in some cases that are not attained in others, and certain changes in the mode of operating the signaling-currents rendered advisable or necessary; but these are mere incidents to the invention, and form no essential part thereof. I have found, however, that the best results are secured when two concentric sheathings or screens which surround the conductors are connected in circuit in the manner described, and this form I prefer.

In the drawings illustrative of my invention, Figure 1 is a sectional view of an underground conduit for electric conductors, to which my invention may be applied. Fig. 2 is a top view of the same with a portion of the upper section removed. Fig. 3 is a side view of the conduit, showing the manner of applying my invention thereto. Fig. 4 is a view of an underground cable with its parts exposed and with my invention applied, and Figs. 5 and 6 are cross-sections of the same.

In Figs. 1, 2, and 3, the conduit shown consists of lengths, each composed of two sections, A and B, secured together by the links *a*, that are forced over the lugs *b b*. The wires C are laid in the lower sections, between insulating-blocks D, shaped to conform to the shape of the conduit. Between the wires and the pipe are the slabs or sheets E, of insulating material, and the sheets or screens F G, of metal. The screen F or G, of one length of pipe, is electrically connected to the corresponding screen of the next, and so on throughout the entire conduit; but all the screens F are insulated from the screens G. In applying my invention to the conduit, I connect the screens F with the screens G at the ends of the conduit by wires H, and at either or both ends I insert in the circuit thus formed a generator or battery, K. Thus throughout the entire system there are two conductors in close proximity to the working-circuits, which convey a continuous current or currents in opposite directions. This forms a useful and efficient protection against all extraneous electrical distubances and influences and prevents retardation in the working of the lines.

The current in the upper screens, F, flows in one direction, and that in G in the other. I have elsewhere shown that it is desirable in the case of an insulated conductor, between which and the earth is an insulated metal sheathing or screen, to pass a continuous current through the screen in a direction opposite to that of the current in the working-conductors. In the case of a conduit such as I have just described, therefore, I should pass through the conductors in the upper half of the conduit currents in opposite direction to that in the screens F, and in the conductors in the lower half currents in a reverse direction.

In Figs. 4, 5, and 6, the invention as applied to an underground cable is illustrated. This cable consists of a group of insulated wires, L, inclosed by the following layers or sheathings in the order named: two oppositely-wound spiral layers, M, of paper saturated with paraffine and applied with a resinous varnish, a spirally-wound layer of tin-foil, N, a spiral layer of paper, O, a second layer of tin-foil, P, and two or more insulating and protective coatings, R, over all. Of course the character of the layers or their manner of application may be greatly varied, it being only essential that the covering should contain two insulated sheathings, layers, or screens N P.

In carrying out the invention in this case I connect the two layers N P together at the ends of the cable, and insert in the circuit thus formed a battery, K, at one or both ends. This forms a more complete protection than any of which I am aware.

The cable is shown as supported on blocks S in a trough, T, which is laid in a shallow trench and filled with a cheap insulating material.

In the case of a cable, whether subterranean or submarine, it is important to connect the line-wires with the batteries, which supply the current in such manner that the currents shall flow in an opposite direction to that in the sheathing or screen nearest them, as in this way the static effects are largely, if not entirely, obliterated and rapid working rendered possible.

I have found the method of operating electric circuits herein described to be attended with many and important advantages.

I am aware that the conductors of different circuits have been brought together or associated in the same conduit or casing, and that complete or round wire metallic and single-wire or grounded circuits have been so associated; but so far as I am aware all of such circuits have contained translating or signaling instruments. My invention, however, differs essentially from this in that in my system the round-wire circuit is an idle or induction circuit, and contains no devices that interrupt or affect the steady and continuous flow of current.

What I claim is—

1. In a system for the transmission of electrical signals, the combination, with the line-wires of one or more working or signaling circuits, of two insulated conductors in proximity thereto, the said conductors forming an idle or induction circuit, including only a generator of electricity, whereby continuous currents are caused to flow in opposite directions in the vicinity of the working-circuits, as described.

2. In a system for the transmission of electrical signals, the combination, with a group of insulated wires forming the line-wires of working or signaling circuits, of two insulated metallic sheathings or screens connected to form an idle or induction circuit including only a generator of electricity, as set forth.

3. In a system for the transmission of electrical signals, the combination, with a group of insulated wires, of two concentric insulated metallic sheathings or screens surrounding the wires and connected at the ends to form a metallic circuit, and a battery or generator included in the circuit.

4. In an underground cable or conduct, the combination, with a group of wires, of two insulated metallic sheathings or screens connected to form a metallic circuit, and a battery included in said circuit in such manner as to cause the current to flow in a sheathing or screen in a direction opposite to that of the currents in the wires nearest to it, as set forth.

HENRY C. SPALDING.

Witnesses:
JOSEPH T. McDEVITT,
ALONZO B. WENTWORTH.